No. 732,162. PATENTED JUNE 30, 1903.
G. & W. BRAND.
TRAP NEST.
APPLICATION FILED FEB. 20, 1903.
NO MODEL.
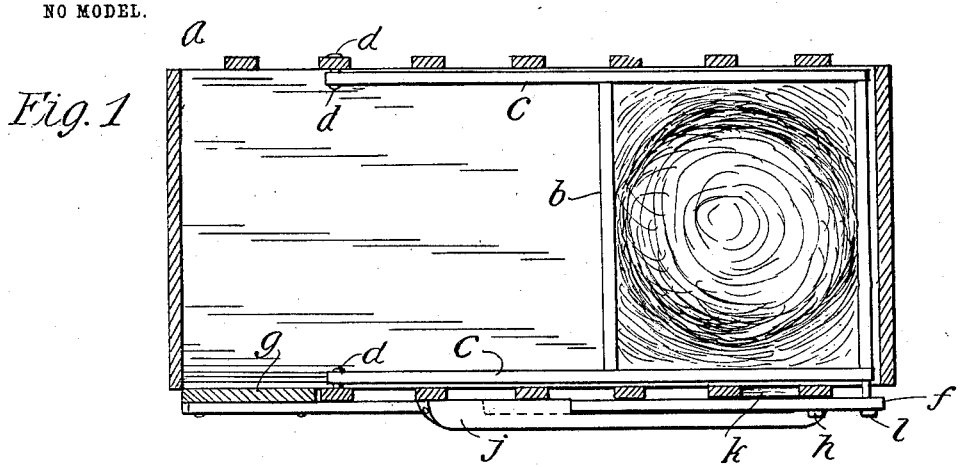
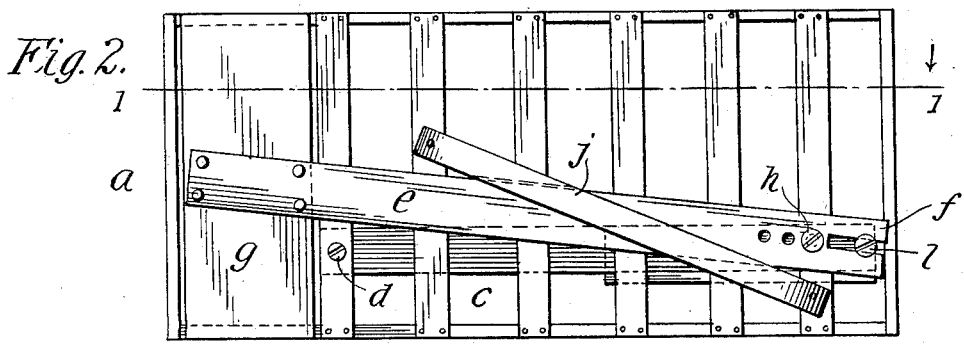
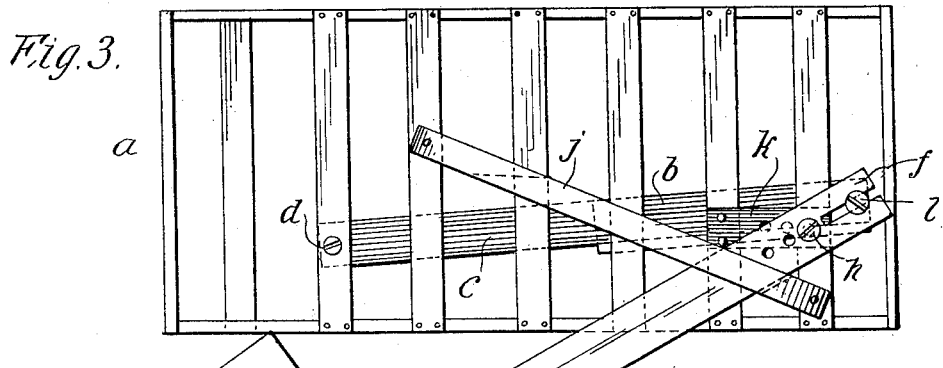
Witnesses:
Inventors:
George Brand
William Brand
By C. A. Bishop
Atty.

No. 732,162.

Patented June 30, 1903.

UNITED STATES PATENT OFFICE.

GEORGE BRAND AND WILLIAM BRAND, OF CAIRO, NEBRASKA.

TRAP-NEST.

SPECIFICATION forming part of Letters Patent No. 732,162, dated June 30, 1903.

Application filed February 20, 1903. Serial No. 144,241. (No model.)

*To all whom it may concern:*

Be it known that we, GEORGE BRAND and WILLIAM BRAND, citizens of the United States, residing at Cairo, Hall county, State of Nebraska, (whose post-office address is Cairo, Hall county, Nebraska,) have invented a new and useful Improvement in Trap-Nests, of which the following is a specification.

Our invention relates to improvements in nests for domestic fowls, and is designed to be placed upon shelves in modern sanitary fowl-houses; and the objects are, first, to provide a portable nest that may be easily removed from the house for cleansing after the incubating period is over; second, to provide an automatic closing trap-nest to protect the sitting fowl from molestation during the incubating period, also while laying the eggs, and to enable their keeper to catch the fowls if he desires to do so; third, to provide a cheap, simple, automatic nest that any farmer can make with the tools and material he has at hand. We attain these objects by a mechanism illustrated in the accompanying drawings, in which—

Figure 1 is a sectional plan view cut on line 1, Fig. 2. Fig. 2 is a front elevation closed. Fig. 3 is a front elevation open.

Similar letters refer to similar parts throughout the several views.

The cage $a$ may be constructed of any suitable material, oblong in form and of sufficient height to accommodate the fowl, a nesting-box $b$, having levers $c\ c$, fixed to each side, extending two-thirds of length of the cage, where they are pivoted at $d\ d$ to the sides of the cage (or slats) three or more inches upward from the bottom. A lever $e$, having a fork $f$ at one end and a door $g$ at the other end, is pivoted to a slat $k$ by a screw $h$. A screw $l$ is fixed in the corner of the nest-box $b$ and engages the fork $f$. A cleat $j$ is fixed diagonally across the front of cage $a$. This cleat has three functions. First, it prevents the door from being pushed away; second, the lower end acts as a stop and prevents the door $g$ from falling too low; third, it also acts as a stop to prevent the door from being lifted too high. The screw $h$ may be moved forward or backward, shortening or lengthening the lever in order to adjust the weight of the door to the weight of the fowl and eggs, which is necessary as the eggs might overbalance the door and it would not drop down when the fowl got off the nest.

In operation the cage is placed on a shelf in the fowl-house with a suitable lighting-board in front of it. The nest-box is filled with hay or other material. The lever-fulcrum $h$ is adjusted so the door will be heavier than the nest, when the door will fall down and open. When the fowl wishes to use the nest, she enters, and as soon as she steps upon the nest she overbalances the door and it moves up and closes, and no other fowl or large animal can disturb her till she comes off the nest, which is a very important matter when hens are sitting.

We are aware that automatic trap-nests are old. Hence we do not claim it broadly; but What we do claim, and wish to secure by Letters Patent, is—

The combination in a trap-nest of the nest-box having levers fixed horizontally on each side, the free ends of said levers pivoted to a cage or box, said nest-box provided with a screw fixed to the outer corner, the actuating-lever having a slot or fork at one end and a door at the opposite end, said fork or slot adapted to engage the screw fixed on the corner of said box, a slat fixed to the front of the cage provided with a fulcrum-screw adapted to engage the actuating-lever, the stop-cleat fixed diagonally across the front of said cage, substantially as described.

GEORGE BRAND.
WILLIAM BRAND.

Witnesses:
J. W. DUNKEL,
C. M. NORTH.